(No Model.)
E. W. DOLPH.
FOOT REST.
No. 271,434.  Patented Jan. 30, 1883.
Figure 1.
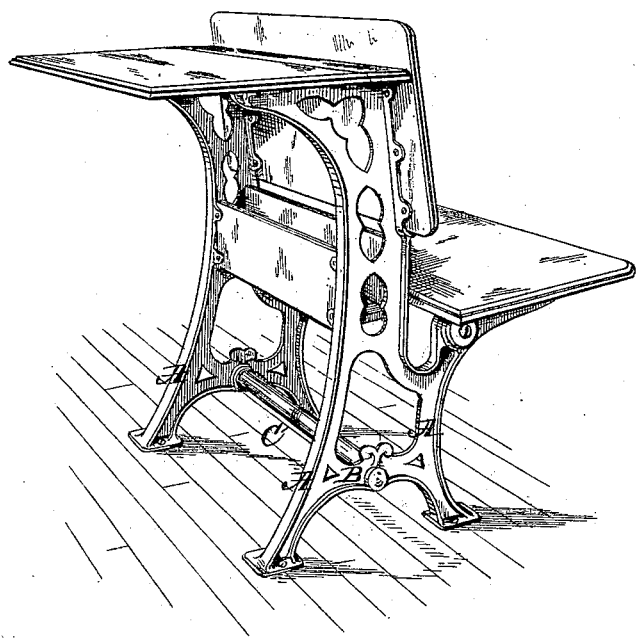
Figure 2.
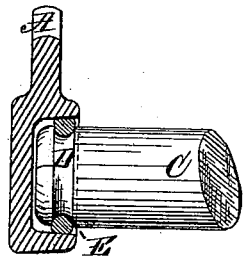
Figure 3.
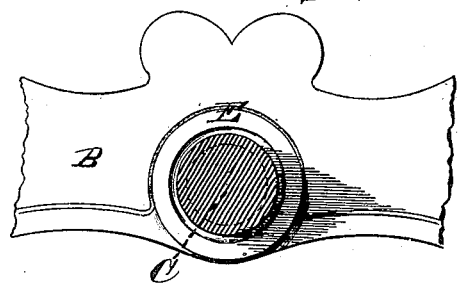
Figure 4.
Witnesses
John W. Ripley
Oscar Mather
Inventor
Edwin W. Dolph
by L. J. Gordon his Atty

UNITED STATES PATENT OFFICE.

EDWIN W. DOLPH, OF BRIDGEPORT, CONNECTICUT.

FOOT-REST.

SPECIFICATION forming part of Letters Patent No. 271,434, dated January 30, 1883.

Application filed November 21, 1882. (No model.)

*To all whom it may concern:*

Be it known that I, EDWIN W. DOLPH, of Bridgeport, county of Fairfield, State of Connecticut, have invented a new and useful Improvement in Foot-Rests, which is fully set forth in the following specification and accompanying drawings, in which—

Figure 1 is a representation of a school seat and desk complete with my improved foot-rest attached; Fig. 2, a section of my improved foot-rest attached to the leg of a seat; Fig. 3, a cut section of the same through the cross-piece connecting the legs of a desk, applied as in Fig. 1; Fig. 4, a rubber ring.

A represent the legs of a seat; B, the cross-piece connecting the same; C, the foot-rest; D, the groove therein; E, the rubber ring.

The object of my invention is to provide an economical and easily-applied foot-rest to the seats of school-desks, railway-cars, and other articles of furniture, which shall not be liable to the inconvenience resulting from the tendency in such appliances as heretofore constructed to become loose and noisy by use, especially from shrinkage of the wood in hot apartments. I accomplish the desired result by the employment of an india-rubber ring, E, fitted tightly within groove D near the end of wooden foot-rest C.

The foot-rest, with the rubber ring attached, is crowded tightly into the opening or orifice provided for it in the cast-iron leg A or the cross-piece B in such manner as to hold it firmly in its place by the expansion of the rubber, and prevent its movement or loosening in the socket, thereby avoiding any noise or inconvenience in use, as it will always remain tight and firm in its position, without being loosened by shrinkage or wear of the wood in the socket after it has once become loose.

What I claim, and desire to secure by Letters Patent, is—

A grooved foot-rest, C, provided with rubber rings E, in combination with a seat supported on legs or frames having apertures for the reception of the said ringed foot-rest, substantially as before set forth.

EDWIN W. DOLPH. [L. S.]

Witnesses:
 F. HURD,
 A. R. LACEY.